US012578314B2

(12) United States Patent
Shibata et al.

(10) Patent No.: US 12,578,314 B2
(45) Date of Patent: Mar. 17, 2026

(54) MOBILE PHASE MONITOR, LIQUID CHROMATOGRAPH, ANALYSIS SYSTEM, AND PROGRAM

(71) Applicant: SHIMADZU CORPORATION, Kyoto (JP)

(72) Inventors: Naruaki Shibata, Kyoto (JP); Takashi Nakao, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 834 days.

(21) Appl. No.: 17/784,632

(22) PCT Filed: Sep. 28, 2020

(86) PCT No.: PCT/JP2020/036561
§ 371 (c)(1),
(2) Date: Jun. 11, 2022

(87) PCT Pub. No.: WO2021/131197
PCT Pub. Date: Jul. 1, 2021

(65) Prior Publication Data
US 2023/0011515 A1    Jan. 12, 2023

(30) Foreign Application Priority Data

Dec. 25, 2019    (JP) ................................. 2019-233785

(51) Int. Cl.
*G01N 30/26* (2006.01)
*G01N 30/02* (2006.01)
*G01N 30/38* (2006.01)

(52) U.S. Cl.
CPC ....... *G01N 30/26* (2013.01); *G01N 2030/027* (2013.01); *G01N 2030/386* (2013.01)

(58) Field of Classification Search
None
See application file for complete search history.

(56) References Cited

U.S. PATENT DOCUMENTS

2013/0079236 A1* 3/2013 Holmes ................. G01N 35/00
204/600
2019/0257731 A1 8/2019 Isoi

FOREIGN PATENT DOCUMENTS

JP      2019-144156 A    8/2019
WO      2020/183563 A1   9/2020

OTHER PUBLICATIONS

Chinese Office Action dated Jul. 31, 2023 in corresponding Chinese Application No. 202080089074.0, with English translation.
(Continued)

*Primary Examiner* — Peter Keyworth
(74) *Attorney, Agent, or Firm* — Renner, Otto, Boisselle & Sklar, LLP

(57) ABSTRACT
A mobile phase monitor includes a measurement unit, an arithmetic unit, a storage, and a discrimination unit. The measurement unit measures a weight of a mobile phase container. The arithmetic unit produces a calibration curve indicating a relationship between a measurement value of the measurement unit and a liquid amount of the mobile phase accommodated in the mobile phase container. The arithmetic unit calculates the liquid amount of the mobile phase from the measurement value of the measurement unit based on the produced calibration curve. The storage stores a plurality of calibration curves respectively corresponding to a plurality of types of mobile phases. The discrimination unit discriminates a type of the mobile phase accommodated in the mobile phase container by searching for the produced calibration curve from the plurality of calibration curves stored in the storage.

10 Claims, 10 Drawing Sheets

(56)          References Cited

OTHER PUBLICATIONS

International Search Report for corresponding Application No.
PCT/JP2020/036561, mailed Dec. 8, 2020.
Written Opinion for corresponding Application No. PCT/JP2020/
036561, mailed Dec. 8, 2020.

* cited by examiner

FIG.2

| TYPE OF MOBILE PHASE | CALIBRATION CURVE |
|:---:|:---:|
| mpA | A |
| mpB | B |
| mpC | C |
| ⋮ | ⋮ |
| mpM | M |

FIG.3

WEIGHT
(kg)

A

B

C

W

LIQUID AMOUNT
(L)

| MOBILE PHASE CONTAINER ID | WEIGHT OF CONTAINER BODY |
|---|---|
| BA | WA |
| BB | WB |
| BC | WC |
| ⋮ | ⋮ |
| BN | WN |

MOBILE PHASE MONITOR, LIQUID CHROMATOGRAPH, ANALYSIS SYSTEM, AND PROGRAM

TECHNICAL FIELD

The present disclosure relates to a mobile phase monitor, a liquid chromatograph, an analysis system, and a program.

BACKGROUND ART

Japanese Patent Laying-Open No. 2019-144156 (PTL 1) discloses a liquid chromatograph having a function of automatically calculating a remaining amount of a mobile phase to notify a person in charge of analysis (operator) of the remaining amount. In the liquid chromatograph described in PTL 1, weight of the mobile phase container is measured by a weight sensor, and a change amount of a measurement value of the weight is divided by density of the mobile phase to obtain consumption of the mobile phase.

CITATION LIST

Patent Literature

PTL 1: Japanese Patent Laying-Open No. 2019-144156

SUMMARY OF INVENTION

Technical Problem

In order to perform the above function, the person in charge of analysis performs work of calibrating the weight sensor and work of registering a type of the mobile phase used for the analysis before starting the analysis. This is because specific gravity varies depending on the type of the mobile phase. In the present specification, the specific gravity refers to a ratio between mass of a substance occupying a certain volume at a certain temperature and mass of a standard substance (water at 4° C.) having the same volume. The residual amount of the mobile phase can be obtained from the weight of the mobile phase measured by the weight sensor during analysis using the specific gravity of the set type of the mobile phase.

However, every time the type of the mobile phase used for the analysis is changed, the operator needs to register the type of the mobile phase. As the types of mobile phases used are diversified, this work becomes complicated, and thus there is a concern that the efficiency of the analysis work is reduced. In addition, there is a concern that the operator may make an artificial mistake such as registration of a wrong type of the mobile phase.

The present disclosure has been made to solve the above problems, and an object of the present disclosure is to facilitate management of a remaining amount of the mobile phase in a liquid chromatograph.

Solution to Problem

A mobile phase monitor according to a first aspect of the present disclosure is configured to manage a liquid amount of a mobile phase accommodated in a mobile phase container. The mobile phase monitor includes a measurement unit, an arithmetic unit, a notification unit, a storage, and a discrimination unit. The measurement unit measures a weight of the mobile phase container. The arithmetic unit produces a calibration curve indicating a relationship between a measurement value of the measurement unit and the liquid amount of the mobile phase accommodated in the mobile phase container. The arithmetic unit calculates the liquid amount of the mobile phase from the measurement value of the measurement unit based on the produced calibration curve. The notification unit notifies an outside of the liquid amount of the mobile phase calculated by the arithmetic unit. The storage stores a plurality of calibration curves respectively corresponding to a plurality of types of mobile phases. The discrimination unit discriminates a type of the mobile phase accommodated in the mobile phase container by searching for the produced calibration curve from the plurality of calibration curves stored in the storage.

Advantageous Effects of Invention

According to the present disclosure, the remaining amount of the mobile phase can be easily managed in the liquid chromatograph.

BRIEF DESCRIPTION OF DRAWINGS

FIG. 2 is a schematic diagram illustrating a calibration curve stored in a storage.

FIG. 3 is a graph illustrating the calibration curve.

FIG. 8 is a schematic view illustrating a weight of a mobile phase container body stored in the storage.

DESCRIPTION OF EMBODIMENT

Figure 1:
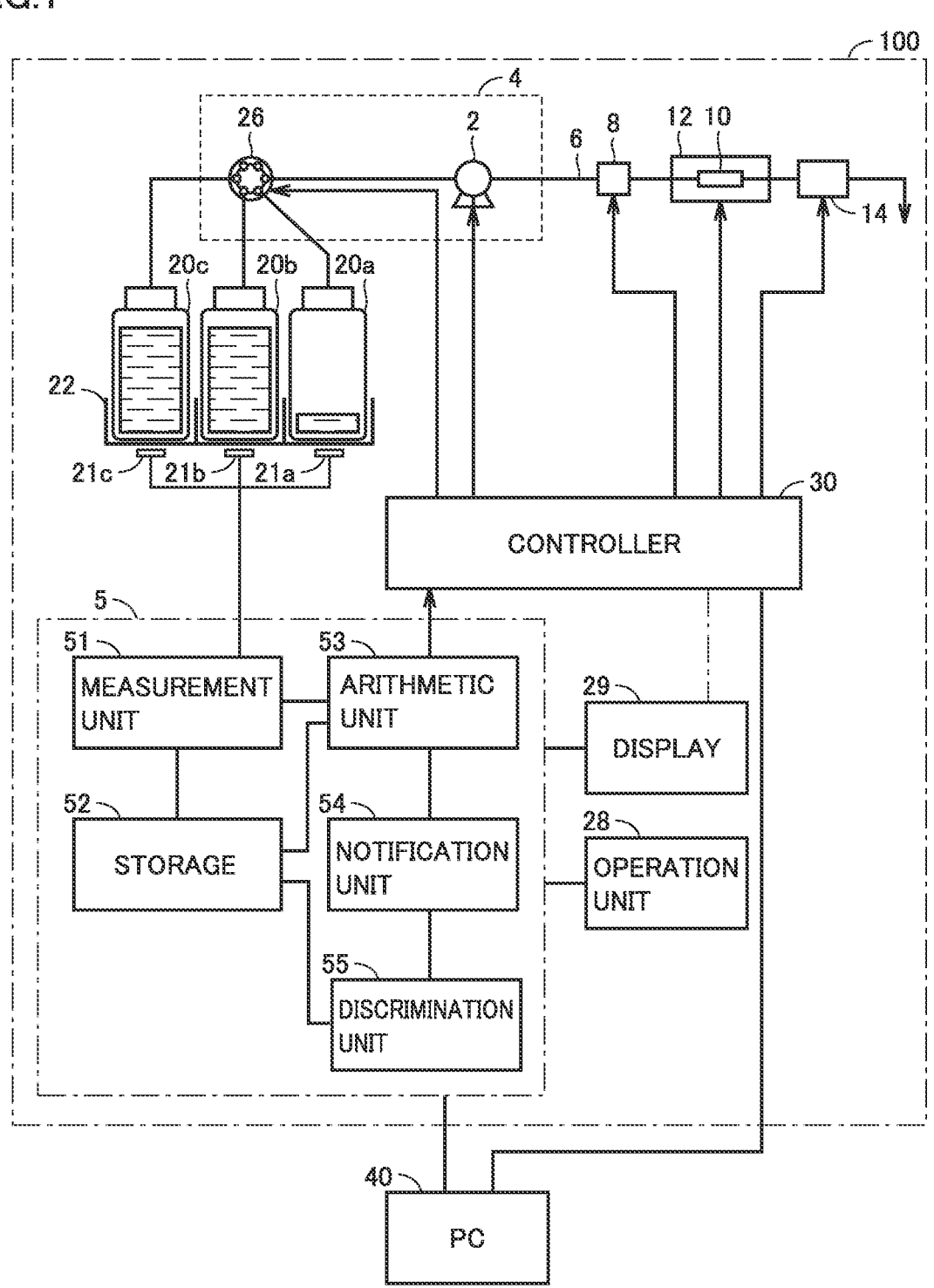
FIG. 1 is a block diagram illustrating a configuration of a liquid chromatograph according to an embodiment.

Hereinafter, an embodiment of the present disclosure will be described with reference to the drawings. In the drawings, the same or corresponding portion is denoted by the same reference numeral, and the description will not be repeated in principle.

<Configuration of Liquid Chromatograph>

FIG. 1 is a block diagram illustrating a configuration of a liquid chromatograph according to an embodiment.

Referring to FIG. 1, a liquid chromatograph 100 includes a plurality of mobile phase containers 20a to 20c, a bottle holder 22, a plurality of load cells 21a to 21c, a liquid feeding unit 4, an analysis channel 6, an automatic sample introduction unit 8, a column 10, a column oven 12, a detector 14, a controller 30, a mobile phase monitor 5, and a display 29.

Each of the plurality of mobile phase containers 20a to 20c accommodates a mobile phase. The plurality of mobile phase containers 20a to 20c are set in bottle holder 22. In the example of FIG. 1, three mobile phase containers 20a to 20c are set in bottle holder 22. The number of mobile phase containers is not limited thereto, but may be one or at least four. Types of the plurality of mobile phase containers may be the same or different. Hereinafter, mobile phase containers 20a to 20c may be collectively referred to as a "mobile phase container 20".

The plurality of load cells 21a to 21c are installed in bottle holder 22. Load cell 21a is installed on a bottom surface side of mobile phase container 20a, and converts a load (gravity) applied from the bottom surface of the mobile phase container 20a into an electric signal. Load cell 21b is installed on the bottom surface side of mobile phase container 20b, and converts the load (gravity) applied from the bottom surface of mobile phase container 20b into the electric signal. Load cell 21c is installed on the bottom surface side of mobile phase container 20c, and converts the load (gravity) applied from the bottom surface of mobile phase container 20c into the electric signal. Load cells 21a to 21c correspond to an example of the "weight sensor" that measures the weights of mobile phase containers 20a to 20c.

A weight sensor other than the load cell can be used as long as the weight sensor can measure the weight of the mobile phase container. Each of load cells 21a to 21c is electrically connected to mobile phase monitor 5, and outputs the generated electric signal to mobile phase monitor 5. The number of load cells is not limited to three, and may be one, or four or more. Hereinafter, load cells 21a to 21c may be collectively referred to as a "load cell 21".

Liquid feeding unit 4 includes a channel switching valve 26 and a liquid feeding pump 2. Channel switching valve 26 is provided between a plurality of mobile phase channels connected to the plurality of mobile phase containers 20a to 20c and liquid feeding pump 2, and selects one of the plurality of mobile phase channels. In the example of FIG. 1, one channel switching valve 26 does not have a hierarchical configuration, but a plurality of stages of hierarchical configurations may be provided by connecting a plurality of channel switching valves 26.

Liquid feeding pump 2 sucks the mobile phases accommodated in mobile phase containers 20a to 20c. Analysis channel 6 is connected to the downstream side of liquid feeding pump 2.

In the example of FIG. 1, because channel switching valve 26 is connected to three mobile phase containers 20a to 20c through the mobile phase channel, for example, mobile phase container 20 in which mobile phases of different types are accommodated can be switched, the type of the mobile phase is selected, and the selected mobile phase is fed to analysis channel 6. Alternatively, channel switching valve 26 can switch the plurality of mobile phase containers 20 in which the same type of the mobile phase is accommodated, and feed a large amount of mobile phase to analysis channel 6. The operation of channel switching valve 26 and liquid feeding pump 2 is controlled by controller 30.

In analysis channel 6, automatic sample introduction unit 8, column 10, and detector 14 are disposed from upstream toward downstream of the flow of the mobile phase. Automatic sample introduction unit 8 introduces a sample into analysis channel 6. Column 10 separates the introduced sample. Column 10 is accommodated in column oven 12. Detector 14 detects a sample component separated by column 10. A mass spectrometer, an absorbance detector, or the like can be used as detector 14.

Mobile phase monitor 5 is configured to manage residual mobile phase amounts in the plurality of mobile phase containers 20a to 20c based on output signals of the plurality of load cells 21a to 21c (weight sensors). Mobile phase monitor 5 may be provided integrally with liquid chromatograph 100, or may be additionally provided later with respect to liquid chromatograph 100. For example, mobile phase monitor 5 is detachably attached to liquid chromatograph 100.

Mobile phase monitor 5 includes a measurement unit 51, a storage 52, an arithmetic unit 53, and a notification unit 54. Measurement unit 51 measures the weight of each of the plurality of mobile phase containers 20a to 20c based on the electrical signals output from the plurality of load cells 21a to 21c. Measurement unit 51 outputs the measurement values of the weights of the plurality of mobile phase containers 20a to 20c to arithmetic unit 53.

Here, the weight of mobile phase container 20 measured by the output of each load cell 21 is a sum of the weight of the mobile phase accommodated in mobile phase container 20 and the weight of the mobile phase container body. Consequently, when the remaining amount of the mobile phase is 0 (zero) (that is, when mobile phase container 20 is empty), the weight of mobile phase container 20 is equal to the weight of the mobile phase container body.

Storage 52 stores the calibration curve indicating the relationship between the measurement value measured by measurement unit 51 and the liquid amount (corresponding to the volume of the mobile phase) accommodated in mobile phase container 20 in each type of the mobile phase. Usually, because the specific gravity varies depending on the type of the mobile phase, the calibration curve indicating the relationship between the weight of mobile phase container 20 and the liquid amount of the mobile phase varies depending on the type of the mobile phase. As described later, measurement unit 51 measures the empty weight (that is, the weight of the mobile phase container body) of mobile phase container 20 and the weight of mobile phase container 20 accommodating the mobile phase of a known liquid amount, and arithmetic unit 53 obtains the calibration curve based on the measurement values. Needless to say, the calibration curve of the known type of the mobile phase may be previously stored in storage 52.

Arithmetic unit 53 reads the calibration curve corresponding to the type of the mobile phase accommodated in mobile phase container 20 from storage 52 for each of the plurality of mobile phase containers 20a to 20c, and calculates the liquid amount (residual amount) of the mobile phase from the measurement value by measurement unit 51 based on the read calibration curve. The type of the mobile phase can be registered for each mobile phase container 20 when the operator calibrates load cell 21 before starting the analysis as described later. Arithmetic unit 53 outputs data indicating the calculated liquid amount of the mobile phase to controller 30 and notification unit 54.

Notification unit 54 is configured to notify the outside of the liquid amount of the mobile phase that is accommodated in each mobile phase container 20 and calculated by arithmetic unit 53. Thus, a mobile terminal device (for example, a smartphone or the like) possessed by the operator can be notified of the remaining amount of the mobile phase for each mobile phase container 20. Instead of notification unit 54, controller 30 may be configured to notify the remaining amount of the mobile phase.

Controller 30 controls operation of each unit of liquid chromatograph 100. Controller 30 includes a central processing unit (CPU), a memory, and an input and output buffer that inputs and outputs various signals. The CPU develops a program stored in an external storage device such as a hard disk or a solid state disk in a memory and executes the program. The program stored in the external storage device is a program in which a processing procedure of controller 30 is described. Controller 30 executes various controls in liquid chromatograph 100 according to these programs. This control is not limited to the processing by software, but can be processed by dedicated hardware (electronic circuit).

Controller 30 can be implemented by a computer dedicated to liquid chromatograph 100 or a general-purpose personal computer. An example of the dedicated computer is a system controller. When implemented as the system controller, controller 30 can be communicably connected to an external general-purpose personal computer 40.

Personal computer 40 may be communicatively connected only to liquid chromatograph 100, or a plurality of analysis devices including liquid chromatograph 100 or another device through a network. In either case, the communication between personal computer 40 and each device may be implemented by wireless communication or wired communication.

Controller 30 controls the operation of liquid feeding unit 4 based on the data indicating the remaining amount of the mobile phase for each mobile phase container 20 sent from mobile phase monitor 5. Specifically, controller 30 controls switching operation of the plurality of mobile phase containers 20a to 20c in channel switching valve 26 according to the remaining amount of the mobile phase for each mobile phase container 20. Controller 30 also controls the liquid feeding amount per unit time in liquid feeding pump 2.

Upon receiving the detection signal from detector 14, controller 30 also generates a chromatogram by processing the detection signal. Controller 30 further holds calibration curve data described later, and can quantify the analysis component.

Display 29 and operation unit 28 are connected to mobile phase monitor 5 and controller 30. Display 29 is configured of a liquid crystal panel or the like. Operation unit 28 receives operation input of the operator to liquid chromatograph 100. Typically, operation unit 28 is configured of a touch panel, a mouse, a keyboard, and the like.

Display 29 is configured to be able to display a setting screen on which the person in charge of analysis instruct setting or change of liquid chromatograph 100 including mobile phase monitor 5. The operator can instruct the setting or change of liquid chromatograph 100 through operation unit 28.

When controller 30 is a system controller and is connected to personal computer 40 or personal computer 40 on a network, liquid chromatograph 100 including mobile phase monitor 5 can be configured to be set or changed by accessing the setting screen of display 29 connected to the system controller through a web browser installed in personal computer 40.

<Description of Calibration Curve>

The calibration curve stored in storage 52 will be described below.

FIG. 2 illustrates the calibration curve stored in storage 52. As illustrated in FIG. 2, storage 52 stores a plurality of calibration curves corresponding to the types of mobile phases. Specifically, a "calibration curve A" is stored in the calibration curve when the type of the mobile phase is "mpA (for example, pure water)", a "calibration curve B" is stored in the calibration curve when the type of the mobile phase is "mpB (for example, ethanol)", and a "calibration curve C" is stored in the calibration curve when the type of the mobile phase is "mpC (for example, acetonitrile)".

Figure 3:
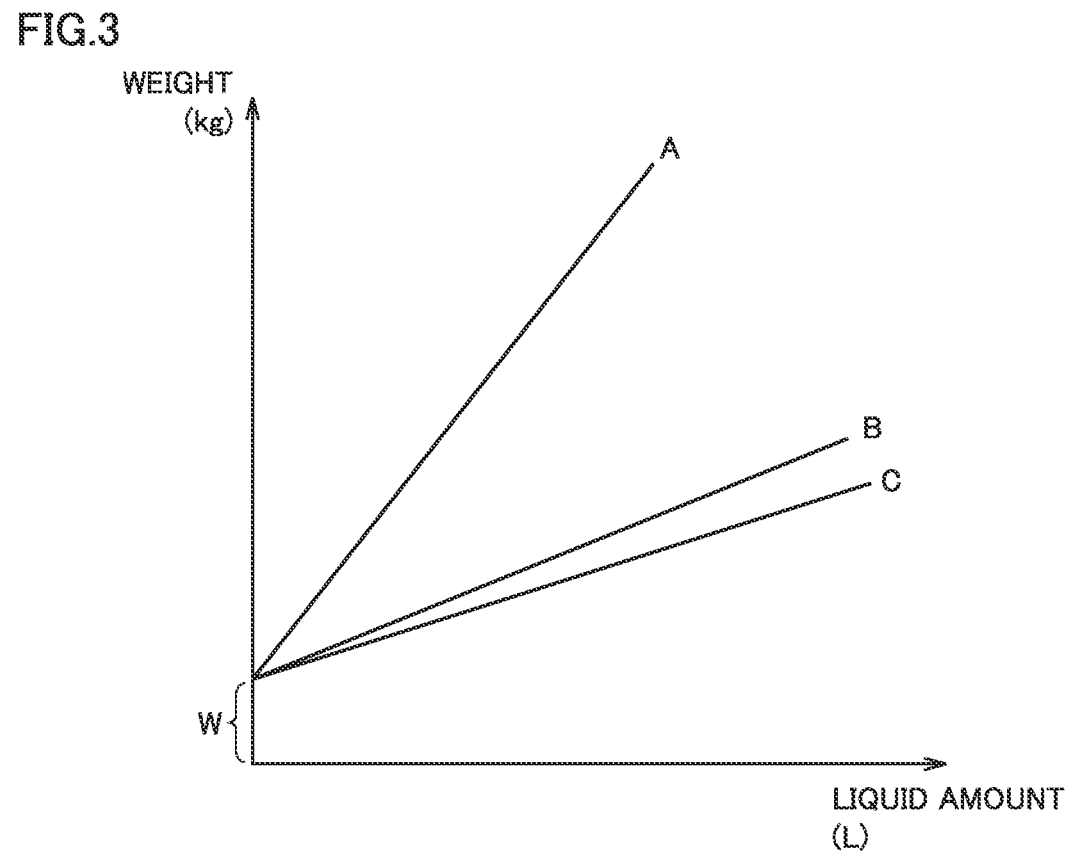

FIG. 3 is a graph illustrating calibration curve A to calibration curve C. In the graph of FIG. 3, a vertical axis represents the liquid amount (L) of the mobile phase, and a horizontal axis represents the weight (kg) of the mobile phase container. Weight W of the mobile phase container is the weight of the mobile phase container body when the remaining amount of the mobile phase is 0 (zero).

As illustrated in FIG. 3, each of calibration curves A to C can be expressed as a linear function in which the weight of the mobile phase container increases as the liquid amount of the mobile phase increases. An inclination of the linear function corresponds to the specific gravity of the mobile phase. The specific gravity is magnitude of gravity applied to the unit volume of the substance. When the type of the mobile phase is the same, although an intercept (weight W) of the vertical axis of the linear function varies depending on an individual difference of the mobile phase container, the inclination (that is, the specific gravity of the mobile phase) of the linear function has substantially the same value. In the example of FIG. 3, because mobile phases mpA to mpC are different from each other in kind, the inclinations of the linear functions (the specific gravity of the mobile phase) are also different from each other.

Storage 52 can store each of calibration curves A to C in a form of the linear function. Specifically, storage 52 can store the inclination (that is, the specific gravity of the mobile phase) of the linear function as the form of the linear function. Alternatively, for example, storage 52 can store each of calibration curves A to C in the form of numerical data of the weight of the mobile phase container for every 0.1 L from 0.1 L to 10 L.

In the table of FIG. 2, the calibration curves of other types of mobile phases are stored in addition to the calibration curves of the three types of mobile phases in FIG. 3. Although FIG. 2 illustrates the example in which different calibration curves are labeled as the type of mobile phase by dividing the calibration curves by the substance name of the mobile phase, the different calibration curves may be labeled as the type of mobile phase by dividing the calibration curves for each analysis application, each operator, or the like, or may be labeled as the type of mobile phase by combining items such as the substance name of the mobile phase, the analysis application, and the operator.

<Processing of Measuring Liquid Amount (Residual Amount) of Mobile Phase>

Processing of measuring the liquid amount (remaining amount) of the mobile phase in mobile phase monitor 5 will be described below.

As described above, in order to calculate the liquid amount of the mobile phase using the calibration curve corresponding to the type of the mobile phase, the type of the mobile phase is required to be registered for each mobile phase container 20 before starting the analysis. The operator can input the type of the mobile phase to each of the mobile phase containers 20a to 20c through operation unit 28 while displaying the setting screen on display 29.

However, the operator needs to input the type of the mobile phase every time the type of the mobile phase accommodated in mobile phase container 20 is changed. As the types of mobile phases used are diversified, this work becomes complicated, and thus there is a concern that the efficiency of the analysis work is reduced. In addition, there is a concern that the operator may make an artificial mistake such as registration of a wrong type of the mobile phase.

In liquid chromatograph 100 of the embodiment, mobile phase monitor 5 further includes a discrimination unit 55 that discriminates the type of the mobile phase accommodated in mobile phase container 20. Discrimination unit 55 is configured to discriminate the type of the mobile phase accommodated in mobile phase container 20 by producing the calibration curve of the mobile phase accommodated in mobile phase container 20 and searching the produced calibration curve from a plurality of calibration curves stored in storage 52. This is based on the fact that, as described in FIG. 3, when the type of the mobile phase is the same, the inclination of the linear function indicating the calibration curve has substantially the same value.

Specifically, discrimination unit 55 searches for at least one candidate from a plurality of types of mobile phases respectively corresponding to the plurality of calibration curves stored in storage 52 for the type of the mobile phase accommodated in mobile phase container 20. Discrimination unit 55 causes display 29 to display the searched at least one candidate. Discrimination unit 55 can further notify the outside of the at least one candidate using notification unit 54.

Upon receiving the operation of selecting one mobile phase type from the at least one candidate, discrimination unit 55 registers the selected one mobile phase type as the mobile phase type accommodated in mobile phase container 20.

Mobile phase monitor 5 has a function of automatically discriminating the type of the mobile phase accommodated in mobile phase container 20 in this manner, so that the work of directly inputting the type of the mobile phase by the operator can be eliminated. Thus, the analysis work can be efficiently performed, and a human error such as erroneous input can be reduced.

Figure 4:
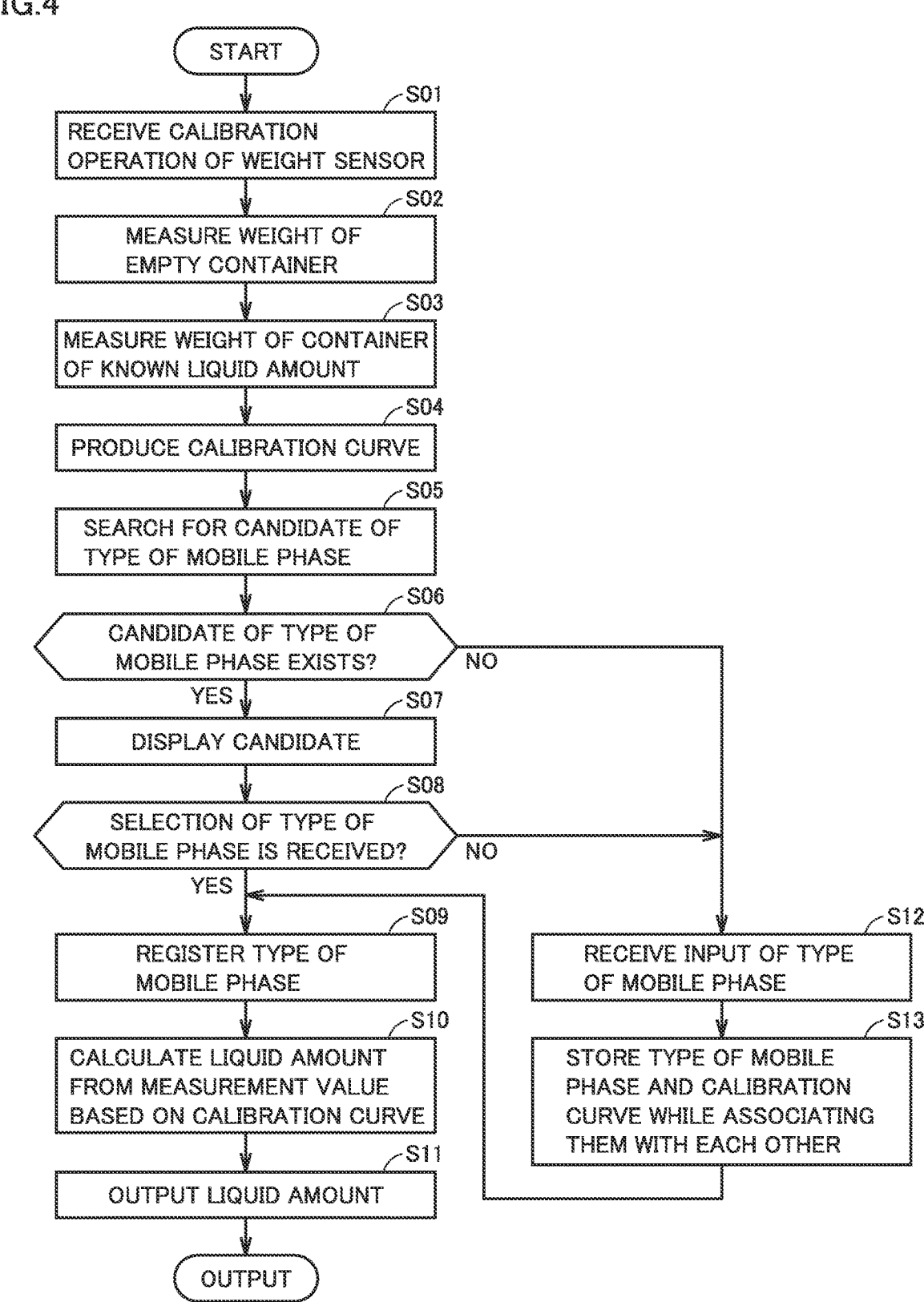
FIG. 4 is a flowchart illustrating a procedure of processing of measuring a liquid amount (remaining amount) of a mobile phase in a mobile phase monitor.

FIG. 4 is a flowchart illustrating a procedure of processing of measuring the liquid amount (remaining amount) of the mobile phase in mobile phase monitor 5.

Referring to FIG. 4, in step S01, operation unit 28 receives operation input in order to calibrate load cell 21 (weight sensor). The calibration of load cell 21 is performed before the analysis is started. The operation input in step S01 is not limited to operation unit 28, but may be performed from personal computer 40 or the mobile terminal device possessed by the operator.

In the calibration of load cell 21, first, in step S02, measurement unit 51 measures the empty weight of mobile phase container 20 (corresponding to weight W of the mobile phase container body in FIG. 2) based on the output signal of load cell 21. Subsequently, in step S03, measurement unit 51 measures the weight of mobile phase container 20 accommodating the mobile phase of the known liquid amount based on the output signal of load cell 21.

In step S04, arithmetic unit 53 produces the calibration curve based on the empty weight of mobile phase container 20 measured in step S02 and the weight of mobile phase container 20 accommodating the mobile phase of the known liquid amount measured in step S03. Specifically, arithmetic unit 53 obtains the linear function from two points of the empty weight of mobile phase container 20 and the weight of mobile phase container 20 accommodating the mobile phase of the known liquid amount, and uses the obtained linear function as the calibration curve.

Subsequently, the processing proceeds to step S05, and discrimination unit 55 refers to the plurality of calibration curves stored in storage 52 to search for the candidate of the type of the mobile phase accommodated in mobile phase container 20 based on the calibration curve produced in step S04. Specifically, discrimination unit 55 searches for the calibration curve that is matched with the calibration curve produced in step S04 from the plurality of calibration curves stored in the table of FIG. 2. In the present specification, the "two calibration curves is matched with each other" is not limited to the case where one calibration curve (linear function) and the other calibration curve (linear function) are strictly matched with each other, but includes the case where the inclination (specific weight) of one calibration curve approximates the inclination (specific weight) of the other calibration curve.

In the search in step S05, when the calibration curve matched with the calibration curve produced in step S04 exists among the plurality of calibration curves stored in storage 52, discrimination unit 55 determines in step S06 that the candidate for the type of the mobile phase accommodated in mobile phase container 20 exists among the plurality of types of the mobile phases corresponding to the plurality of calibration curves (YES in S06). In this case, discrimination unit 55 proceeds to step S07 and displays the searched mobile phase type candidate on display 29. In step S07, notification unit 54 may further notify personal computer 40 and/or the mobile terminal device possessed by the operator of the mobile phase type candidate.

Figure 5:
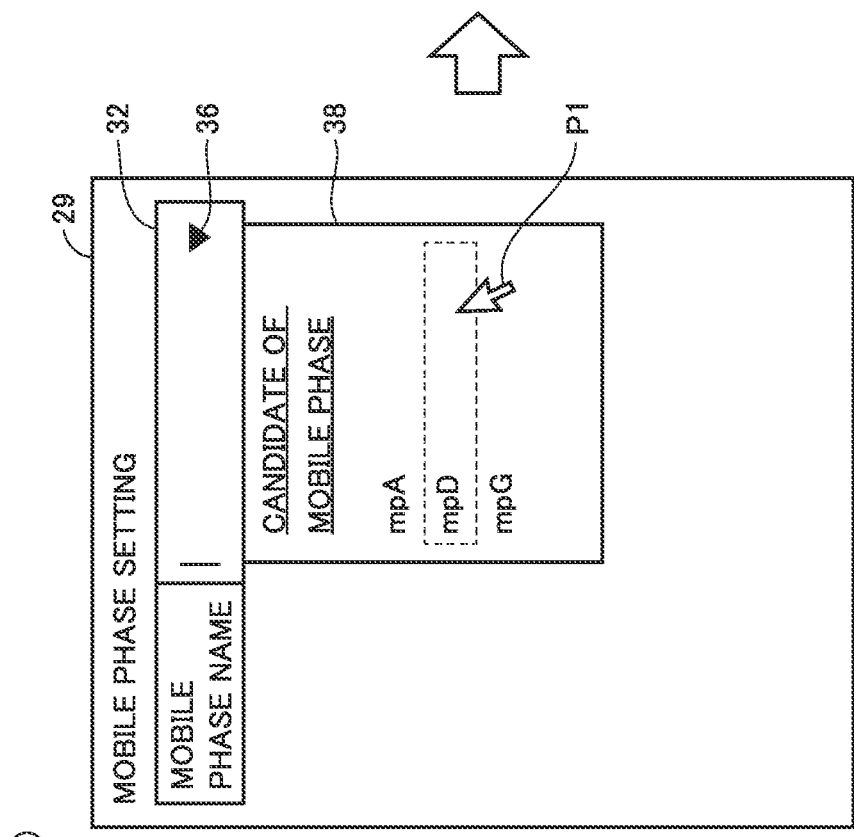
FIG. 5 is a view schematically illustrating a first display example of a display.
Figure 5:
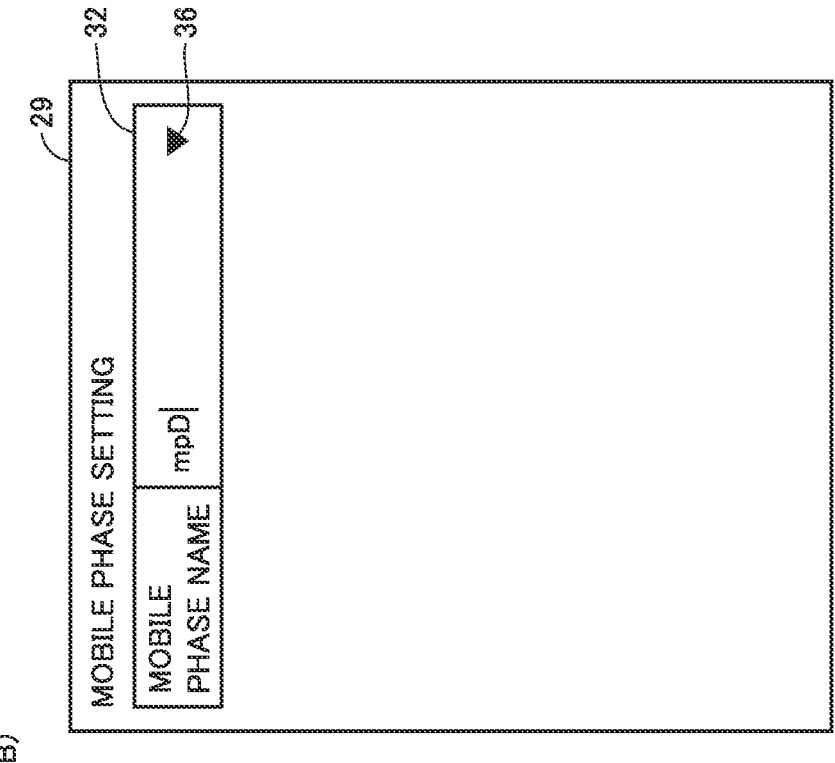

FIG. 5 is a view schematically illustrating a first display example of display 29. FIG. 5(A) illustrates a setting screen in which the type of the mobile phase displayed on display 29 is registered. On the setting screen of display 29, a graphical user interface (GUI) 32 receiving input of the type of the mobile phase (for example, a substance name of the mobile phase) is displayed. The operator can select GUI 32 using operation unit 28 (for example, the mouse) and directly input the type of the mobile phase.

In the right corner of GUI 32, an icon 36 is indicated in order to display the search result in step S05 in FIG. 4. When the operator clicks icon 36 using operation unit 28, GUI 32 displaying the candidate of the type of the mobile phase is displayed below GUI 38. In GUI 38, the substance name is displayed for at least one candidate of the type of the mobile phase obtained by the search in step S05.

The at least one candidate of the type of the mobile phase corresponds to the type of the mobile phase in which the calibration curve is matched with that of the mobile phase accommodated in mobile phase container 20. In the example of FIG. 5(A), three types of mobile phases mpA, mpD, and mpG are indicated as the candidate of the type of the mobile phase.

The operator can select the mobile phase corresponding to the type of the mobile phase accommodated in mobile phase container 20 from the at least one mobile phase type candidate displayed on GUI 38. In the example of FIG. 5(A), a pointer P1 that can be controlled by operation unit 28 is indicated in GUI 38. The operator can select the type of the mobile phase corresponding to the type of the mobile phase accommodated in mobile phase container 20 using pointer P1.

Returning to FIG. 4, when the mobile phase type candidate is displayed on display 29 in step S07, mobile phase monitor 5 can receive the selection of the mobile phase type by the operator. In the example of FIG. 5(A), when the operator selects the type of the mobile phase using GUI 38, the selected type of the mobile phase is automatically written in GUI 32 as illustrated in FIG. 5(B). For example, when the operator selects mobile phase mpD on GUI 38, the substance name of mobile phase mpD is written in GUI 32.

When the selection of the type of the mobile phase is received in step S08 of FIG. 4 (YES in S08), arithmetic unit 53 registers the selected type of the mobile phase as the type of the mobile phase accommodated in mobile phase container 20 in step S09. Accordingly, mobile phase mpD written in GUI 32 of FIG. 5(B) is registered as the type of the mobile phase accommodated in mobile phase container 20.

On the other hand, when the calibration curve matched with the calibration curve calculated in step S04 is not found among the plurality of calibration curves stored in storage 52 in the search in step S05, arithmetic unit 53 determines that the candidate of the type of the mobile phase does not exist among the plurality of types of the mobile phases corresponding to the plurality of calibration curves in step S06 (NO in S06). In this case, arithmetic unit 53 proceeds to step S12 and receives the input of the type of the mobile phase from the operator on the setting screen of display 29.

Figure 6:
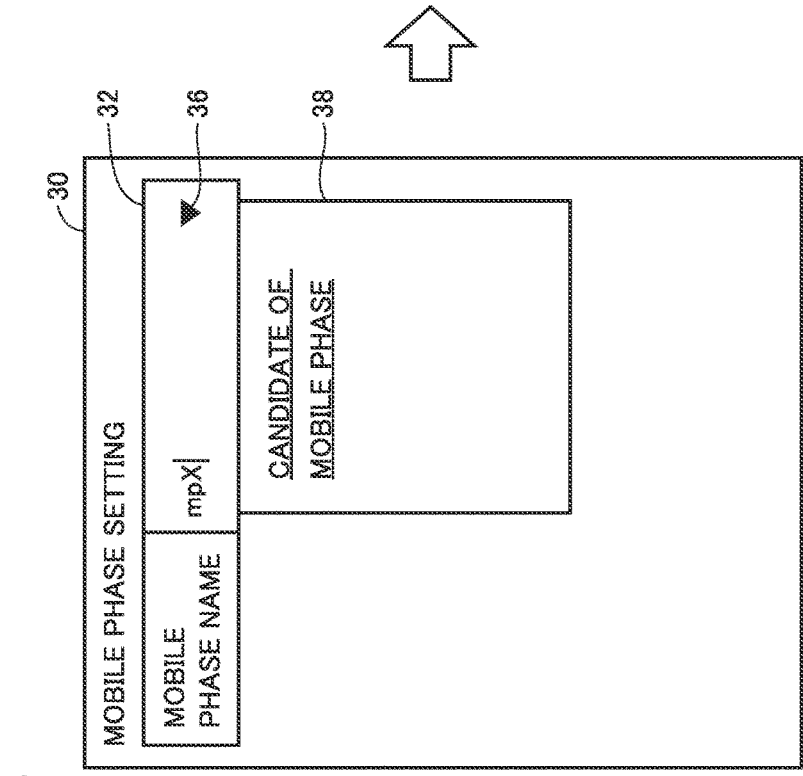
FIG. 6 is a view schematically illustrating a second display example of the display.

FIG. 6 is a view schematically illustrating a second display example of display 29. FIG. 6(A) illustrates a setting screen in which the type of the mobile phase displayed on display 29 is registered. Also on the setting screen of FIG. 6(A), GUI 32 similar to that of FIG. 5(A) is displayed.

When the operator clicks icon 36 illustrated in GUI 32 using operation unit 28, GUI 32 displaying the candidate of the type of the mobile phase is displayed below GUI 38. However, when the candidate of the type of the mobile phase is not found among the plurality of types of the mobile phases stored in storage 52, GUI 38 is left blank, and the type of the mobile phase is not displayed.

In this case, the operator can directly input the type of the mobile phase accommodated in mobile phase container 20 to GUI 32 using operation unit 28. In the example of FIG. 6(A), the substance name of mobile phase mpX is written in GUI 32.

Even when the selection of the type of the mobile phase is not received in step S08 of FIG. 4 (NO in S08), arithmetic unit 53 proceeds to step S12 and receives the input of the mobile phase from the operator on the setting screen of display 29.

When the input of the type of the mobile phase is received in step S12 of FIG. 4, arithmetic unit 53 proceeds to step S13, and stores the type of the mobile phase received in step S12 and the calibration curve calculated in step S04 in storage 52 while associating them with each other. As illustrated in FIG. 6(B), a calibration curve X labeled with the substance name of mobile phase mpX is stored in the table of storage 52.

Arithmetic unit 53 further registers the type of the selected mobile phase as the type of the mobile phase accommodated in mobile phase container 20 in step S09. Accordingly, mobile phase mpX written in GUI 32 of FIG. 6(B) is registered as the type of the mobile phase accommodated in mobile phase container 20.

Subsequently, in step S10, arithmetic unit 53 calculates the liquid amount of the mobile phase from the measurement value of the weight of mobile phase container 20 measured by load cell 21 based on the calibration curve calculated in step S04. Specifically, when the type of the mobile phase in mobile phase container 20 is mpA, arithmetic unit 53 calculates the liquid amount of the mobile phase from the weight of mobile phase container 20 using calibration curve A. When the type of the mobile phase in the mobile phase container 20 is mpB, arithmetic unit 53 calculates the liquid amount of the mobile phase from the weight of mobile phase container 20 using calibration curve B. When the type of the mobile phase in mobile phase container 20 is mpC, arithmetic unit 53 calculates the liquid amount of the mobile phase from the weight of mobile phase container 20 using calibration curve C.

In step S11, arithmetic unit 53 outputs the liquid amount of the mobile phase in mobile phase container 20 calculated in step S10. Specifically, arithmetic unit 53 outputs the liquid amount of the mobile phase in mobile phase container 20 to controller 30 and personal computer 40 through notification unit 54. Arithmetic unit 53 also notifies the external mobile terminal device of the liquid amount of the mobile phase in mobile phase container 20 through notification unit 54. Thus, the operator who possesses the mobile terminal device can monitor the liquid amount of the mobile phase in real time even when the operator is not near liquid chromatograph 100.

In order to simplify the description, mobile phase monitor 5 outputs the liquid amount of the mobile phase in step S11 and then ends the processing. However, in actual measurement, while liquid chromatograph 100 is operated, the calculation of the liquid amount of the mobile phase (S10) and the output of the liquid amount (S11) are repeated at predetermined time intervals (for example, one-second intervals). In addition, the processing (S01) of receiving the operation input for calibrating load cell 21 (weight sensor) is basically performed each time the mobile phase container is changed or each time the type of the mobile phase accommodated in the mobile phase container is changed.

In the flowchart of FIG. 4, the configuration example in which the selection or input of the type of the mobile phase is received on the setting screen (see FIGS. 5 and 6) displayed on display 29 is illustrated. However, the selection or input of the type of the mobile phase can also be received from personal computer 40 or the mobile terminal device.

As described above, in liquid chromatograph 100 of the embodiment, mobile phase monitor 5 produces the calibration curve for the mobile phase accommodated in mobile phase container 20, and searches for at least one candidate of the type of the mobile phase accommodated in mobile phase container 20 from among the plurality of types of the mobile phases respectively corresponding to the plurality of calibration curves stored in storage 52 based on the produced calibration curve. Mobile phase monitor 5 displays the at least one candidate on display 29, and receives the operation in which the operator selects one type of the mobile phase from the at least one candidate.

According to this, the operator can register the type of the mobile phase accommodated in mobile phase container 20 by selecting the candidate corresponding to the type of the mobile phase accommodated in mobile phase container 20 from at least one candidate displayed on display 29. Accordingly, the work of directly inputting the type of the mobile phase becomes unnecessary. Consequently, the liquid amount (remaining amount) of the mobile phase can be easily managed. As a result, the analysis work can be efficiently performed, and the human error such as erroneous input can be reduced.

In addition, in the case where the type corresponding to the type of the mobile phase accommodated in mobile phase container 20 is not found among the types of the mobile phases corresponding to the plurality of calibration curves stored in storage 52, when the operator inputs the type of the mobile phase accommodated in mobile phase container 20, the input type of the mobile phase is stored in storage 52 while associated with the produced calibration curve. Thus, when the same type of the mobile phase is accommodate in mobile phase container 20, the type of the mobile phase is included in at least one candidate indicated by mobile phase monitor 5 from the next time. Accordingly, the operator can register the type of the mobile phase by selecting the type of the mobile phase from the at least one candidate. That is, the work of directly inputting the type of the mobile phase becomes unnecessary from the next time.

In this manner, each time a new type of the mobile phase having no history of past use is accommodated in mobile phase container 20, the type of the mobile phase and the calibration curve thereof are stored in storage 52 of mobile phase monitor 5 while associated with each other, so that the number of calibration curves stored in storage 52 increases. According to this, by repeatedly the use of mobile phase monitor 5, search accuracy of the type of the mobile phase is improved, and the efficiency of the analysis work is promoted.

In addition, because the calibration curve accumulated in storage 52 reflects the use history of the mobile phase in liquid chromatograph 100, the calibration curve stored in storage 52 is customized for each liquid chromatograph according to the analysis application. Thus, when liquid chromatograph 100 is used for a predetermined analysis purpose, the efficiency of the analysis operation can be promoted.

In the processing of FIG. 4, when the weight of the mobile phase container body used is known, the processing of measuring the weight of the mobile phase container body (S02) can be omitted in order to produce the calibration curve. For example, the weight of the mobile phase container body may be previously stored for each of the plurality of types of the mobile phase containers, and the weight corresponding to the mobile phase container used may be read from storage 52 when the calibration curve is calculated.

On the other hand, even when the types of mobile phase containers are the same, there may be an individual difference in weight among the plurality of mobile phase containers. For this reason, an ID (identification number) is assigned to each mobile phase container, the mobile phase container ID is labeled, and the weight of the mobile phase container body can be stored in storage 52. Upon receiving the input of the mobile phase container ID, mobile phase monitor 5 reads the weight of the mobile phase container body corresponding to the mobile phase container ID from storage 52, and produces the calibration curve using the read weight of the mobile phase container body.

Figure 7:
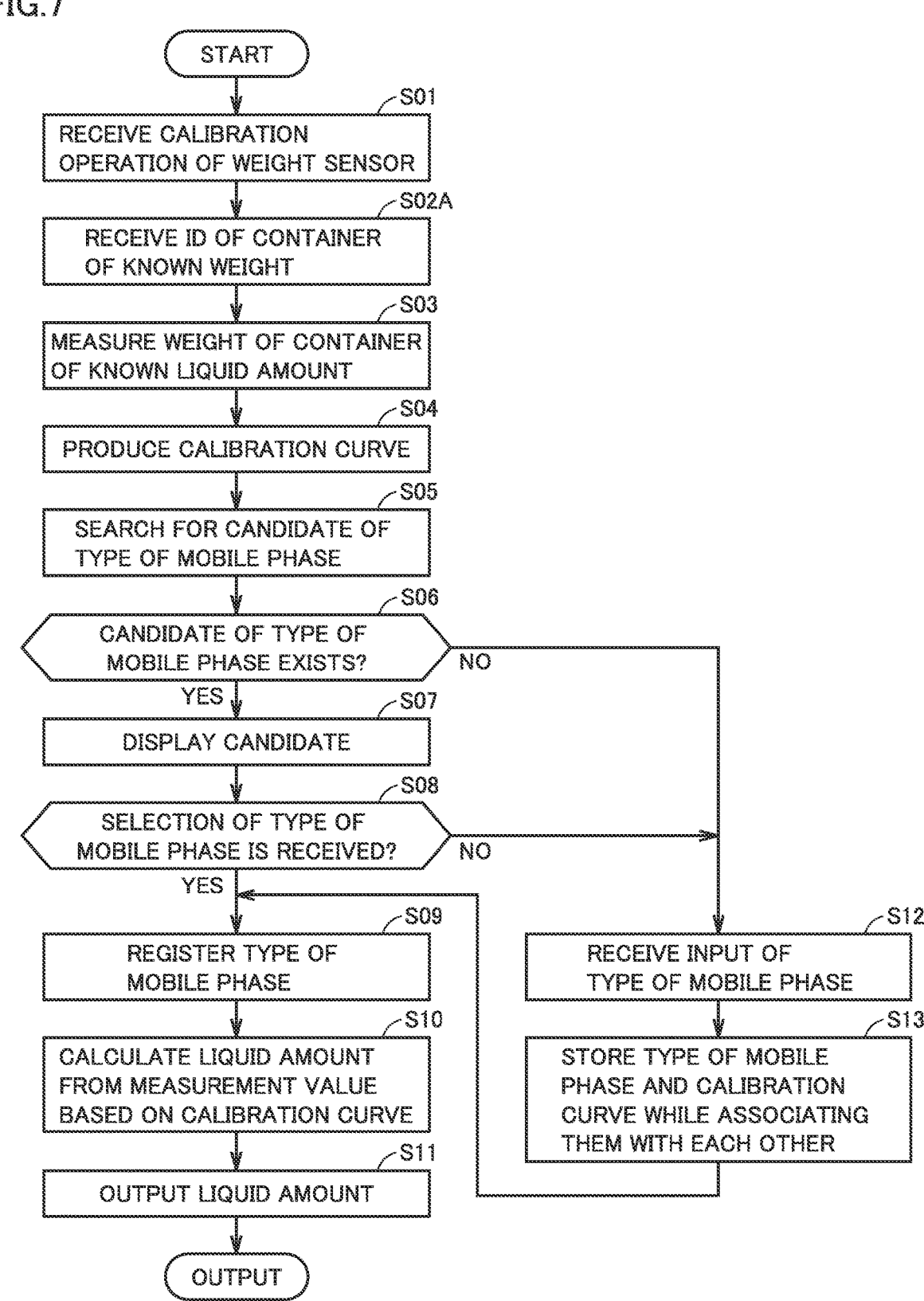
FIG. 7 is a flowchart illustrating a modification of the procedure of the processing of measuring the liquid amount (remaining amount) of the mobile phase in the mobile phase monitor.

FIG. 7 is a flowchart illustrating a modification of the procedure of the processing of measuring the liquid amount (remaining amount) of the mobile phase in mobile phase monitor 5.

The flowchart in FIG. 7 is obtained by replacing step S02 of the flowchart in FIG. 4 with step S02A. Other steps are the same as those in FIG. 4, and the description thereof is not repeated.

In step S02A, mobile phase monitor 5 receives input of mobile phase container ID. Specifically, the operator inputs the mobile phase container ID of mobile phase container 20 used using operation unit 28. The mobile phase container ID may be input from controller 30, personal computer 40, or the mobile terminal device.

Arithmetic unit 53 reads the capacity of the mobile phase container body corresponding to the mobile phase container ID received in step S02A from storage 52, thereby acquiring the weight of the mobile phase container body for mobile phase container 20. FIG. 8 is a schematic view illustrating the weight of the mobile phase container body stored in storage 52. As illustrated in FIG. 8, storage 52 stores the weight of the mobile phase container body in response to mobile phase container ID. For example, when mobile phase container ID is "BA", "WA (kg)" is stored as the weight of the mobile phase container body.

On the other hand, when the weight of the mobile phase container body corresponding to the mobile phase container ID received in step S02A is not stored in storage 52, the empty weight of the mobile phase container is required to be measured. For this reason, mobile phase monitor 5 outputs a guide prompting the measurement of the empty weight of mobile phase container 20 to the outside through notification unit 54, thereby notifying the operator. In this case, mobile phase monitor 5 measures the empty weight of mobile phase container 20, and produces the calibration curve using the measurement value.

As for the weight of the mobile phase container body, similarly to the calibration curve, the newly measured weight of the mobile phase container body may be stored in storage 52 while the mobile phase container ID is labeled. Consequently, when the same mobile phase container is used, the processing of measuring the empty weight of the mobile phase container can be omitted from the next time.

<Configuration of Analysis System>

An analysis system including the liquid chromatograph 100 according to the present embodiment will be described below.

Figure 9:
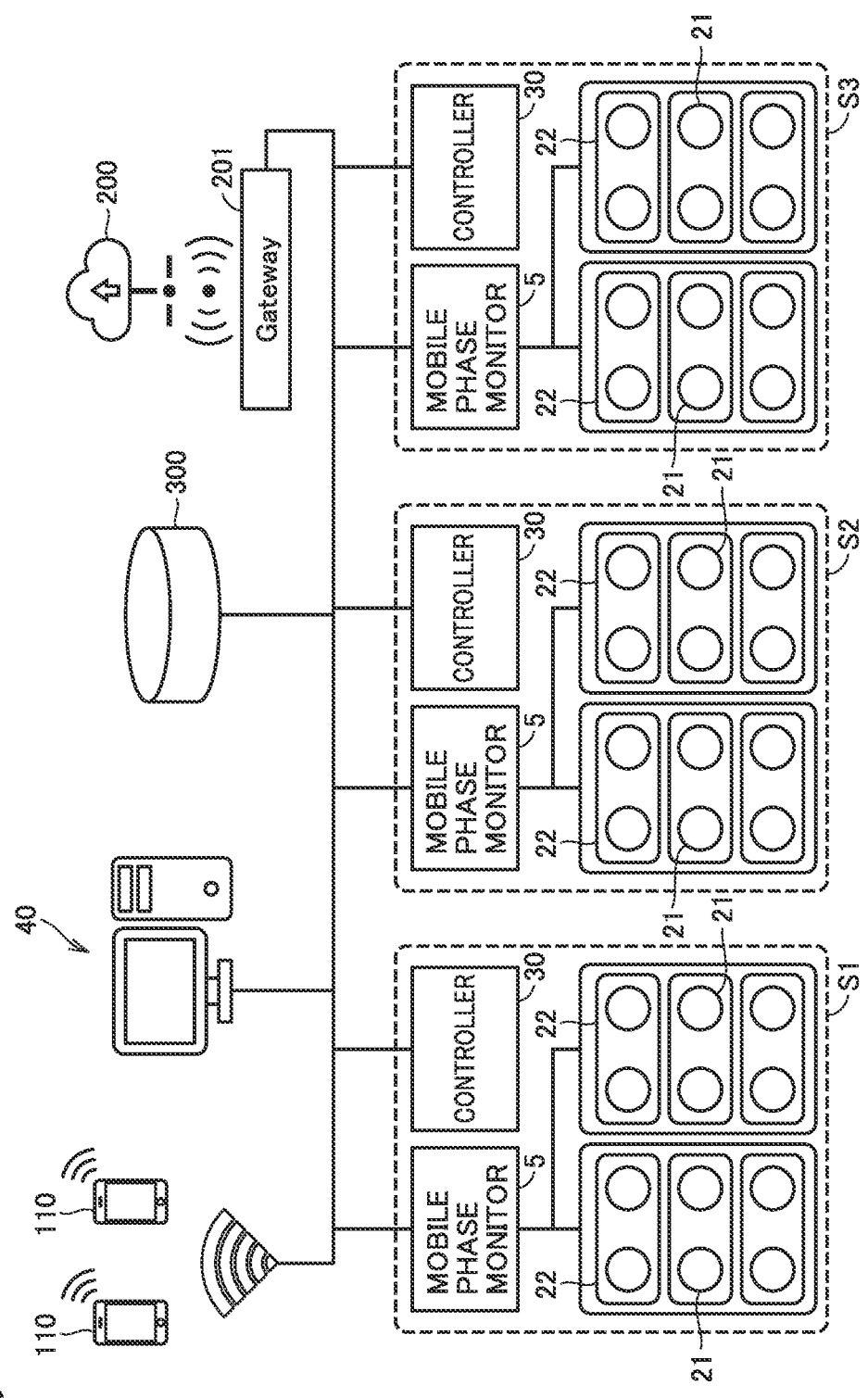
FIG. 9 is a schematic diagram illustrating a configuration example of an analysis system of the embodiment.

FIG. 9 is a schematic diagram illustrating a configuration example of the analysis system of the embodiment.

Referring to FIG. 9, the analysis system includes a plurality of liquid chromatographs S1 to S3, a personal computer 40, a mobile terminal device (for example, a smartphone) 100, and a storage 300. These devices are communicably connected to each other. A communication method between the devices may be either wired or wireless. The analysis system is further connected to a cloud 200 through a gateway 201.

Each of the plurality of liquid chromatographs S1 to S3 has the same configuration as liquid chromatograph 100 in FIG. 1. That is, each of liquid chromatographs S1 to S3 includes mobile phase monitor 5 and controller 30. Mobile phase monitor 5 is connected to load cell 21 (weight sensor) provided at the bottom of bottle holder 22, and acquires the output signal from load cell 21. Mobile phase monitor 5 produces the calibration curve for the mobile phase accommodated in the mobile phase container based on the output signal of load cell 21, calculates the liquid amount of the mobile phase using the produced calibration curve, and outputs data of the liquid amount of the mobile phase to be calculated to controller 30 and personal computer 40.

Mobile phase monitor 5 can further output data of the liquid amount of the mobile phase to mobile terminal device 110. Thus, the operator possessing mobile terminal device 110 can monitor the liquid amount of the mobile phase in real time through mobile terminal device 110 even when the operator is at a position away from the liquid chromatograph.

In addition, mobile phase monitor 5 can output information about the liquid amount of the mobile phase to cloud 200. Consequently, history information about the liquid amount of the mobile phase can be stored in cloud 200. How the liquid amount of the mobile phase has changed in the past analysis can be verified.

Storage 300 is configured to be able to store the data of the calibration curve stored in storage 52 of each of the plurality of liquid chromatographs S1 to S3. Storage 300 is configured of a nonvolatile storage device such as a solid state drive (SSD) and a hard disk drive (HDD). Storage 300 can be built in a server (not illustrated) that manages the entire analysis system.

Storage 300 can further acquire and store the data of the calibration curve stored in a storage of another analysis system from cloud 200 through gateway 201.

In each of liquid chromatographs S1 to S3, mobile phase monitor 5 can search for the candidate of the type of the mobile phase accommodated in the mobile phase container utilizing the calibration curve stored in storage 52 of mobile phase monitor 5 of another device stored in storage 300 in addition to the calibration curve stored in storage 52 of the own device. According to this, the search range of the mobile phase type candidate can be expanded, so that the probability of finding the mobile phase type candidate can be increased.

In addition, mobile phase monitor 5 can switch the search range of the mobile phase type candidate. Specifically, the operator can designate another device that utilizes the calibration curve stored in storage 52. For example, by designating another device having common analysis application, the data of the calibration curve stored in storage 52 of another device can be utilized.

Figure 10:
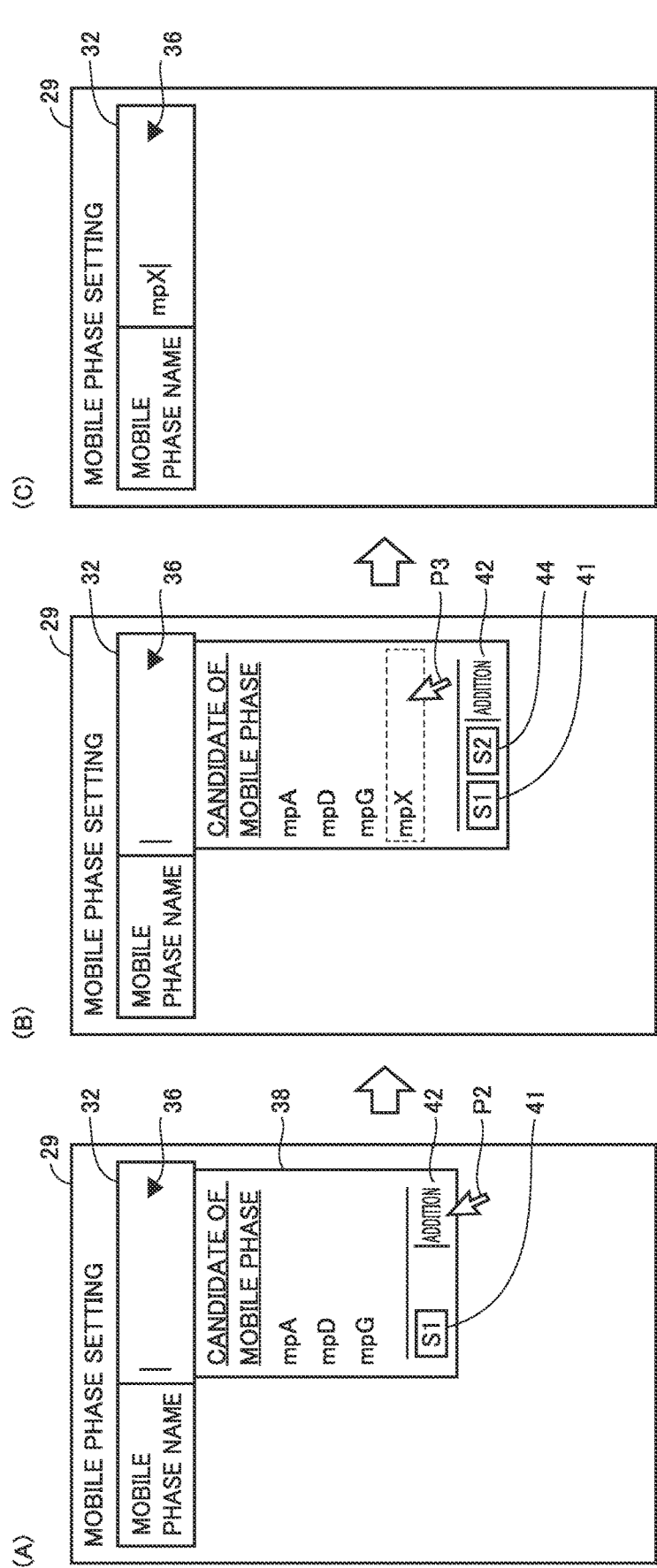
FIG. 10 is a view schematically illustrating a display example of the display of the liquid chromatograph.

FIG. 10 is a view schematically illustrating a display example of the display of liquid chromatograph S1. FIG. 10(A) illustrates a setting screen in which the type of the mobile phase displayed on the display is registered. GUI 32 similar to that of FIGS. 5(A) and 6(A) is also displayed on the setting screen of FIG. 10(A).

When the operator clicks icon 36 illustrated in GUI 32 using operation unit 28, GUI 32 displaying the candidate of the type of the mobile phase is displayed below GUI 38. In GUI 38, the substance name is displayed for at least one candidate of the type of the mobile phase obtained by the search in step S05.

An icon 41 indicating the search range and an icon 42 instructing switching of the search range are indicated in GUI 38. In FIG. 10(A), icon 41 indicates that the search range is storage 52 of liquid chromatograph S1 that is the own device.

When the candidate corresponding to the type of the mobile phase accommodated in the mobile phase container is not found among the at least one candidate of the type of the mobile phase illustrated in GUI 38, the operator can change (add) the search range by operating icon 42. For example, when the operator clicks icon 42 using a pointer P2, a search range setting screen (not illustrated) is displayed on display 29. The operator can designate another device that uses the data of the calibration curve on the setting screen. The search range is not limited to the data of the calibration curve of another device stored in storage 300, but can include the data of the calibration curve of another analysis system stored in cloud 200.

For example, when liquid chromatograph S2 is designated, as illustrated in FIG. 10(B), an icon 44 indicating that the search range is storage 52 of liquid chromatograph S2 is added to GUI 38. The search is performed again within the expanded search range, whereby the candidate of the type of the mobile phase is updated. In the example of FIG. 10(B), the number of candidates of the type of the mobile phase is increased.

When the candidate corresponding to the type of the mobile phase accommodated in mobile phase container 20 exists among the updated candidates of the type of the mobile phase, the operator can select the corresponding type of the mobile phase. In the example of FIG. 10(B), a pointer P3 that can be controlled by operation unit 28 is illustrated in GUI 38. The operator can select the type of the mobile phase corresponding to the type of the mobile phase accommodated in mobile phase container 20 using pointer P3.

When the operator selects the type of the mobile phase in GUI 38, the selected type of the mobile phase is automatically written in GUI 32 as illustrated in FIG. 10(C). For example, when the operator selects mobile phase mpX on GUI 38, the substance name of mobile phase mpX is written in GUI 32.

As described above, in the analysis system of the embodiment, each of the plurality of liquid chromatographs can search for the candidate of the type of the mobile phase accommodated in the mobile phase container using the data of the calibration curve stored in storage 52 of mobile phase monitor 5 of another device. Accordingly, even when the candidate of the type of the mobile phase is not found in the data of the calibration curve stored in storage 52 of mobile phase monitor 5 of the own device, the candidate of the type of the mobile phase can be found from the data of the calibration curve stored in storage 52 of mobile phase monitor 5 of another device. Thus, even when the type of the mobile phase accommodated in the mobile phase container is the type of the mobile phase that is used in the own device in the past, the work of directly inputting the type of the mobile phase can become unnecessary. As a result, the analysis work can be efficiently performed, and the human error such as erroneous input can be reduced.

ASPECTS

It is understood by those skilled in the art that the plurality of embodiments described above are specific examples of the following aspects.

(Item 1) A mobile phase monitor according to one aspect manages a liquid amount of a mobile phase accommodated in a mobile phase container. The mobile phase monitor includes a measurement unit, an arithmetic unit, a notification unit, a storage, and a discrimination unit. The measurement unit measures a weight of the mobile phase container. The arithmetic unit produces a calibration curve indicating a relationship between a measurement value of the measurement unit and the liquid amount of the mobile phase accommodated in the mobile phase container. The arithmetic unit calculates the liquid amount of the mobile phase from the measurement value of the measurement unit based on the produced calibration curve. The notification unit notifies an outside of the liquid amount of the mobile phase calculated by the arithmetic unit. The storage stores a plurality of calibration curves respectively corresponding to a plurality of types of mobile phases. The discrimination unit discriminates a type of the mobile phase accommodated in the mobile phase container by searching for the produced calibration curve from the plurality of calibration curves stored in the storage.

The mobile phase monitor described in Item 1 includes the discrimination unit that automatically discriminates the type of the mobile phase stored in the mobile phase container, so that the work of directly inputting the type of the mobile phase by the operator can be eliminated. Thus, the remaining amount of the mobile phase can be easily managed. Consequently, the analysis work can be efficiently performed, and a human error such as erroneous input can be reduced.

(Item 2) In the mobile phase monitor described in Item 1, the discrimination unit is configured to search for at least one candidate from the plurality of types of mobile phases respectively corresponding to the plurality of calibration curves stored in the storage, for the type of the mobile phase accommodated in the mobile phase container. The notification unit notifies the outside of the at least one candidate searched by the discrimination unit.

According to the mobile phase monitor described in Item 2, the operator can register the type of the mobile phase accommodated in the mobile phase container by selecting the candidate corresponding to the type of the mobile phase accommodated in the mobile phase container from at least one candidate notified from the mobile phase monitor. Accordingly, the work of directly inputting the type of the mobile phase becomes unnecessary.

(Item 3) The mobile phase monitor described in Item 2 further includes an operation unit (28) that receives an operation for the mobile phase monitor. When the operation unit receives an operation of selecting one type of the mobile phase from the at least one candidate, the discrimination unit registers the selected type of the mobile phase as the type of the mobile phase accommodated in the mobile phase container.

According to the mobile phase monitor described in Item 3, the operator can register the type of the mobile phase accommodated in the mobile phase container by selecting the candidate corresponding to the type of the mobile phase accommodated in the mobile phase container from at least one candidate notified from the mobile phase monitor. Accordingly, the work of directly inputting the type of the mobile phase becomes unnecessary.

(Item 4) In the mobile phase monitor described in Item 3, when the operation unit receives an operation of inputting one type of the mobile phase, the discrimination unit registers the input type of the mobile phase as the type of mobile phase accommodated in the mobile phase container.

According to the mobile phase monitor described in Item 4, the operator can register the type of the mobile phase accommodated in the mobile phase container by selecting the type of the mobile phase in the case where the candidate corresponding to the type of the mobile phase accommodated in the mobile phase container is not found in at least one candidate notified from the mobile phase monitor.

(Item 5) In the mobile phase monitor described in Item 4, when the operation unit receives the operation of inputting one type of the mobile phase, the discrimination unit stores the inputted type of the mobile phase in the storage while associating the inputted type of the mobile phase with the calibration curve produced by the arithmetic unit.

According to the mobile phase monitor described in Item 5, because the type of the input mobile phase is stored in the storage while associated with the produced calibration curve, the type of the mobile phase is included in at least one candidate notified from the mobile phase monitor when the same type of mobile phase is accommodated in the mobile phase container from the next time. Accordingly, the operator can register the type of the mobile phase by selecting the type of the mobile phase from the at least one candidate. That is, the work of directly inputting the type of the mobile phase becomes unnecessary from the next time.

(Item 6) In the mobile phase monitor described in Items 1 to 5, the arithmetic unit produces the calibration curve based on a measurement value of a weight of a mobile phase container body and a measurement value of a weight of the mobile phase container accommodating the mobile phase of a known liquid amount.

According to the mobile phase monitor described in Item 6, the arithmetic unit can calculate the liquid amount of the mobile phase from the weight of the mobile phase container measured by the measurement unit based on the calibration curve corresponding to the type of the mobile phase, so that the liquid amount (remaining amount) of the mobile phase can be easily managed regardless of the type of the mobile phase.

(Item 7) In the mobile phase monitor described in any one of Items 1 to 5, the storage is further configured to store a weight of a mobile phase container body for each mobile phase container. The arithmetic unit reads the weight of the mobile phase container body corresponding to the mobile phase container from the storage, and produces the calibration curve based on the read weight of the mobile phase container body and a measurement value of a weight of the mobile phase container accommodating the mobile phase of a known liquid amount.

According to the mobile phase monitor described in Item 7, the processing of measuring the weight of the mobile phase container body can be omitted, so that the calibration work of the weight sensor can be efficiently performed.

(Item 8) In a liquid chromatograph according to one aspect, an introduced sample is separated by a column to detect a sample component. The liquid chromatograph includes: a mobile phase container that accommodates a mobile phase sent to the column; the mobile phase monitor described in Items 1 to 7; and a liquid feeding unit that feeds the mobile phase accommodated in the mobile phase container to the column.

According to the liquid chromatograph described in Item 8, the mobile phase monitor includes the discrimination unit that automatically discriminates the type of the mobile phase stored in the mobile phase container, so that the work of directly inputting the type of the mobile phase by the operator can be eliminated. Thus, the remaining amount of the mobile phase can be easily managed.

(Item 9) In an analysis system according to one aspect, a plurality of mobile phase monitors are communicably connected. Each of the plurality of mobile phase monitors is configured by the mobile phase monitor described in Item 1 to Item 7. In each of the plurality of mobile phase monitors, the discrimination unit discriminates a type of the mobile phase accommodated in the mobile phase container by searching for the produced calibration curve from the plurality of calibration curves stored in the storage of at least two of the mobile phase monitors including an own device.

According to the analysis system described in Item 9, each of the plurality of mobile phase monitors can search for the candidate of the type of the mobile phase accommodated in the mobile phase container using the calibration curve stored in the storage of the mobile phase monitor of another device in addition to the calibration curve stored in the storage of the own device. According to this, the search range of the mobile phase type candidate can be expanded, so that the probability of finding the mobile phase type candidate can be increased.

(Item 10) The analysis system described in Item 9 further includes a nonvolatile storage device that is communicably connected to the plurality of mobile phase monitors and stores the plurality of calibration curves stored in the storage of each of the plurality of mobile phase monitors.

According to the analysis system described in Item 10, each of the plurality of mobile phase monitors can search for the candidate of the type of the mobile phase accommodated in the mobile phase container using the calibration curve stored in the storage of the mobile phase monitor of another device stored in the nonvolatile storage device. Each mobile phase monitor can switch the search range of the mobile phase type candidate. Thus, the search accuracy can be improved.

(Item 11) In the analysis system described in Item 9 or 10, the notification unit of each mobile phase monitor is configured to be able to notify the mobile terminal device of information.

According to the analysis system described in Item 11, the operator who possesses the mobile terminal device can monitor the liquid amount of the mobile phase in real time even when the operator is not near the mobile phase monitor.

(Item 12) In the analysis system described in Items 9 to 11, each mobile phase monitor is configured to be able to receive an operation of selecting at least two mobile phase monitors.

According to the analysis system described in Item 12, each mobile phase monitor 5 can switch the search range of the mobile phase type candidate. For example, the operator of each mobile phase monitor can utilize the data of the calibration curve stored in the storage of another device by designating the search range of the mobile phase monitor of another device having the common analysis application.

(Item 13) A program according to one aspect causing a computer to execute a method for managing a liquid amount of a mobile phase accommodated in a mobile phase container. The method includes: measuring a weight of the mobile phase container; producing a calibration curve indicating a relationship between a measurement value of a weight of the mobile phase container and the liquid amount of the mobile phase accommodated in the mobile phase container; calculating the liquid amount of the mobile phase from the weight of the mobile phase container based on the produced calibration curve; notifying an outside of the liquid amount of the mobile phase calculated in the calculating; storing a plurality of calibration curves respectively corresponding to a plurality of types of mobile phases; and discriminating a type of the mobile phase accommodated in the mobile phase container by searching for the produced calibration curve from the plurality of calibration curves.

The problem described in Item 13 includes a function of automatically discriminating the type of the mobile phase stored in the mobile phase container, so that the work of directly inputting the type of the mobile phase by the operator can be eliminated. Thus, the remaining amount of the mobile phase can be easily managed. Consequently, the analysis work can be efficiently performed, and a human error such as erroneous input can be reduced.

It should be considered that the disclosed embodiment is an example in all respects and not restrictive. The scope of the present invention is defined by not the description of the embodiment, but the claims, and it is intended that all changes within the meaning and scope of the claims are included in the present invention.

REFERENCE SIGNS LIST

2: liquid feeding pump, 4: liquid feeding unit, 5: mobile phase monitor, 6: analysis channel, 8: automatic sample introduction unit, 10: column, 12: column oven, 14: detector, 20, 20a to 20c: mobile phase container, 21, 21a to 21c: load cell (weight sensor), 22: bottle holder, 26: channel switching valve, 28: operation unit, 29: display, 30: controller, 40: personal computer, 51: measurement unit, 52: storage, 53: arithmetic unit, 54: notification unit, 55: discrimination unit, 100: liquid chromatograph, 110: mobile terminal device, 200: cloud, 201: gateway, 300: storage

The invention claimed is:

1. A liquid chromatograph separating an introduced sample by a column to detect a sample component, the liquid chromatograph comprising:
   a mobile phase container configured to accommodate a mobile phase sent to the column;
   a mobile phase monitor configured to manage a liquid amount of the mobile phase accommodated in the mobile phase container; and
   a liquid feeding unit configured to feed the mobile phase accommodated in the mobile phase container to the column, wherein the mobile phase monitor includes:
   a weight sensor that measures a weight of the mobile phase container;
   a computer memory that stores a plurality of calibration curves respectively corresponding to a plurality of types of mobile phases; and
   a computer controller, wherein:
      the computer controller produces a calibration curve based on a measurement value of a weight of a mobile phase container body and a measurement value of a weight of the mobile phase container accommodating the mobile phase of a known liquid, and
      discriminates a type of the mobile phase accommodated in the mobile phase container by searching for the produced calibration curve from the plurality of calibration curves stored in the computer memory, and
      the computer controller further calculates the liquid amount of the mobile phase from the measurement value of the weight sensor based on the produced calibration curve, and notifies an outside computer different from the computer controller of the liquid amount of the mobile phase, such that an operator of the outside computer can monitor the liquid amount of the mobile phase in real time through the outside computer.

2. The liquid chromatograph according to claim 1, wherein
   the computer controller is configured to search for at least one candidate from the plurality of types of mobile phases respectively corresponding to the plurality of calibration curves stored in the computer memory, for the type of the mobile phase accommodated in the mobile phase container, and
   notifies the outside computer of the at least one candidate searched.

3. The liquid chromatograph according to claim 2, further comprising an operation unit that receives an operation for the mobile phase monitor, wherein
   when the operation unit receives an operation of selecting one type of the mobile phase from the at least one candidate, the computer controller registers the selected type of the mobile phase as the type of the mobile phase accommodated in the mobile phase container.

4. The liquid chromatograph according to claim 3, wherein
   when the operation unit receives an operation of inputting one type of the mobile phase, the computer controller registers the input type of the mobile phase as the type of mobile phase accommodated in the mobile phase container.

5. The liquid chromatograph according to claim 4, wherein
   when the operation unit receives the operation of inputting one type of the mobile phase, the computer controller stores the inputted type of the mobile phase in the computer memory while associating the inputted type of the mobile phase with the calibration curve produced by the computer controller.

6. The liquid chromatograph according to claim 1, wherein
   the computer memory is further configured to store a weight of the mobile phase container body for each mobile phase container, and
   the computer controller reads the weight of the mobile phase container body corresponding to the mobile phase container from the computer memory, and produces the calibration curve based on the read weight of the mobile phase container body and a measurement value of a weight of the mobile phase container accommodating the mobile phase of a known liquid amount.

7. An analysis system in which a plurality of liquid chromatographs are communicatively connected, wherein each of the plurality of liquid chromatographs is configured by the liquid chromatograph according to claim 1, and in each of the plurality of liquid chromatographs, the computer controller discriminates a type of the mobile phase accommodated in the mobile phase container by searching for the produced calibration curve from the plurality of calibration curves stored in the computer memory of at least two of the mobile phase monitors including an own device.

8. The analysis system according to claim 7, further comprising a nonvolatile storage device that is communicably connected to the plurality of liquid chromatographs and stores the plurality of calibration curves stored in the computer memory of each of the plurality of liquid chromatograph.

9. The analysis system according to claim 7, wherein in each of the plurality of liquid chromatographs, the computer controller is configured to be able to notify a mobile terminal device of information.

10. The analysis system according to claim 7, wherein each of the plurality of liquid chromatography is configured to be able to accept an operation of selecting the at least two mobile phase monitors.

* * * * *